United States Patent
Geffard

(10) Patent No.: US 12,042,456 B2
(45) Date of Patent: Jul. 23, 2024

(54) METHOD FOR AUTOMATIC LOAD COMPENSATION FOR A COBOT OR AN UPPER LIMB EXOSKELETON

(71) Applicant: COMMISSARIAT A L'ENERGIE ATOMIQUE ET AUX ENERGIES ALTERNATIVES, Paris (FR)

(72) Inventor: Franck Geffard, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 644 days.

(21) Appl. No.: 17/270,744

(22) PCT Filed: Aug. 29, 2019

(86) PCT No.: PCT/EP2019/073142
§ 371 (c)(1),
(2) Date: Feb. 23, 2021

(87) PCT Pub. No.: WO2020/043851
PCT Pub. Date: Mar. 5, 2020

(65) Prior Publication Data
US 2022/0347038 A1    Nov. 3, 2022

(30) Foreign Application Priority Data
Aug. 30, 2018   (FR) ..................... 18 57829

(51) Int. Cl.
*A61H 1/02*    (2006.01)
(52) U.S. Cl.
CPC ... *A61H 1/0274* (2013.01); *A61H 2201/1215* (2013.01); *A61H 2201/1635* (2013.01); *A61H 2201/501* (2013.01); *A61H 2201/5058* (2013.01)

(58) Field of Classification Search
CPC .......... A61H 1/0274; A61H 2201/1215; A61H 2201/1635; A61H 2201/501;
(Continued)

(56) References Cited

U.S. PATENT DOCUMENTS

| 5,551,308 A | * | 9/1996 | Arai | ........................ G01L 5/226 73/862.541 |
| 2009/0177306 A1 | * | 7/2009 | Bosga | ................... B30B 15/148 901/6 |

(Continued)

FOREIGN PATENT DOCUMENTS

WO    2016/146960 A1    9/2016
WO    2018/050191 A1    3/2018
(Continued)

OTHER PUBLICATIONS

International Stage Entry of PCT/EP2019/073142 dated Nov. 25, 2019 [PCT/ISA/210].
(Continued)

*Primary Examiner* — Khoi H Tran
*Assistant Examiner* — Tristan J Greiner
(74) *Attorney, Agent, or Firm* — Sughrue Mion, PLLC

(57) ABSTRACT

A control method for controlling an actuator (11) connected to a load (50) for handling, the method comprising the steps of:
  detecting an intention to handle the load (50);
  applying an increasing command to the actuator (11) until detecting a movement of the actuator (11);
  storing the value reached by the command when a movement of the actuator (11) is detected;
  using the stored value reached by the command to determine an estimate of the opposing force exerted by the load (50) for handling; and
  controlling the actuator by means of a force servocontrol relationship using the estimate of the opposing force
(Continued)

exerted by the load (50) for handling in order to establish the commands to be applied to the actuator (11).

A cobot (1) arranged to perform the method.

15 Claims, 11 Drawing Sheets

(58) Field of Classification Search
CPC ........... A61H 2201/5058; B25J 9/0006; G05B 2219/39523
See application file for complete search history.

(56) References Cited

U.S. PATENT DOCUMENTS

| | | | |
|---|---|---|---|
| 2013/0173058 A1* | 7/2013 | Seo | B25J 13/085 700/260 |
| 2014/0142470 A1* | 5/2014 | Elia | A63B 21/4019 601/5 |
| 2014/0277724 A1* | 9/2014 | Suyama | B25J 9/1676 700/255 |
| 2016/0370789 A1* | 12/2016 | Zasowski | G05B 19/042 |
| 2018/0005173 A1* | 1/2018 | Elazary | B25J 13/085 |
| 2020/0170547 A1* | 6/2020 | Bai | B25J 9/1694 |

FOREIGN PATENT DOCUMENTS

| | | | |
|---|---|---|---|
| WO | WO-2018050191 A1 * | 3/2018 | ........... A61B 5/1107 |
| WO | 2019/025266 A1 | 2/2019 | |

OTHER PUBLICATIONS

Written Opinion of PCT/EP2019/073142 dated Nov. 25, 2019 [PCT/ISA/237].

* cited by examiner

METHOD FOR AUTOMATIC LOAD COMPENSATION FOR A COBOT OR AN UPPER LIMB EXOSKELETON

CROSS REFERENCE TO RELATED APPLICATIONS

This application is a National Stage of International Application No. PCT/EP2019/073142 filed Aug. 29, 2019, claiming priority based on French Patent Application No. 18 57829 filed Aug. 30, 2018.

FIELD OF THE INVENTION

The present invention relates to the field of cobotics and more particularly of assistance exoskeletons.

BACKGROUND OF THE INVENTION

A known way of controlling an actuator of an assistance exoskeleton consists in performing force servocontrol in which the force setpoint represents either a fraction of a load for handling (partial compensation) or else all of it (total compensation). Passive exoskeletons make use of springs that are designed to deliver compensation forces that are calibrated relative to a load of known weight. For active exoskeletons, it is also necessary to know the weight of the load for handling in order to apply the correct compensation force. Numerous algorithms exist for controlling an exoskeleton actuator, e.g. such as speed control of proportional-integral (PI) type, external force control, acceleration control, or open loop control.

OBJECT OF THE INVENTION

An aim of the invention is to reduce prior operations of measuring the weight of a load for handling by an actuator.

SUMMARY OF THE INVENTION

To this end, there is provided a control method for controlling an actuator that is functionally connected to a load for handling and that is controlled by a control unit, the method comprising the steps of:
  detecting an intention to handle the load for handling;
  applying an increasing command to the actuator seeking to cause the load for handling to move until detecting a movement of the actuator or of the load or until detecting that the intention to handle the load for handling has ceased;
  storing the value reached by the command and/or by a sensor linked to the actuator when a movement of the actuator or of the load for handling is detected or when detecting that the intention to handle the load for handling has ceased;
  using the stored value reached by the command and/or by the sensor linked to the actuator to determine an estimate of the opposing force exerted by the load for handling; and
  controlling the actuator by means of a force servocontrol relationship using the estimate of the opposing force exerted by the load for handling in order to establish the commands to be applied to the actuator.

Thus, control of the actuator no longer requires information to be available about the weight of the load for handling before it is handled by the actuator. The handling device controlled by the method of the invention enables loads of various weights to be handled without that leading to any constraints for the user.

Advantageously, the increasing command results from a non-zero speed setpoint applied by the control unit.

Also advantageously, the increasing command comprises an increasing force command applied by the monitor and control unit. Adapting to actuators including a rotary motor is easy when the increasing force command comprises a torque command.

In a particularly advantageous embodiment, the estimate of the opposing force is determined by using the value taken by a sensor for sensing the current of the actuator (or an estimate of this current) when a movement of the actuator is detected.

It is advantageously possible to omit making use of a current sensor when the estimate of the opposing force of the load for handling is determined by using the value taken by a current setpoint being sent to the actuator when a movement of the actuator is detected.

Advantageously, the sensor linked to the gearmotor comprises a force or torque sensor.

The method is particularly fast when the step of detecting a movement of the actuator comprises a step of detecting the crossing of a speed threshold or the crossing of a movement threshold or the crossing of an acceleration threshold.

An inexpensive implementation is obtained when the step of detecting an intention to handle the load for handling comprises a step of detecting a change of state of an intention sensor. Such an implementation is particularly inexpensive when the intention sensor comprises a dry contact. The method is particularly intuitive when the intention sensor is positioned on a hand of a user of the actuator.

Advantageously, the intention sensor comprises a pressure sensor and/or an attitude sensor and/or an acceleration sensor and/or a flexion sensor and/or a myoelectrical sensor.

For reasons of robustness, a plurality of sensors may be placed on the user's hand (and possibly associated with a recognition module) in order to detect the change of state and the intention of the user for as many object shapes and gripping postures as possible.

Performing the method is particularly transparent for the user when the method includes an additional step of resetting the value of the estimate of the weight of the load for handling to zero when the intention to handle the load ceases to be detected.

The invention also applies to a cobot including a monitor and control unit connected to an actuator and to detector means for detecting an intention to handle a load and/or a sensor linked to the actuator, the monitor and control unit being arranged to perform the above-described method.

Other characteristics and advantages of the invention appear in the light of the following description of nonlimiting embodiments of the invention.

BRIEF DESCRIPTION OF THE DRAWINGS

Reference is made to the accompanying figures, in which.

DETAILED DESCRIPTION OF THE INVENTION

Figure 1:
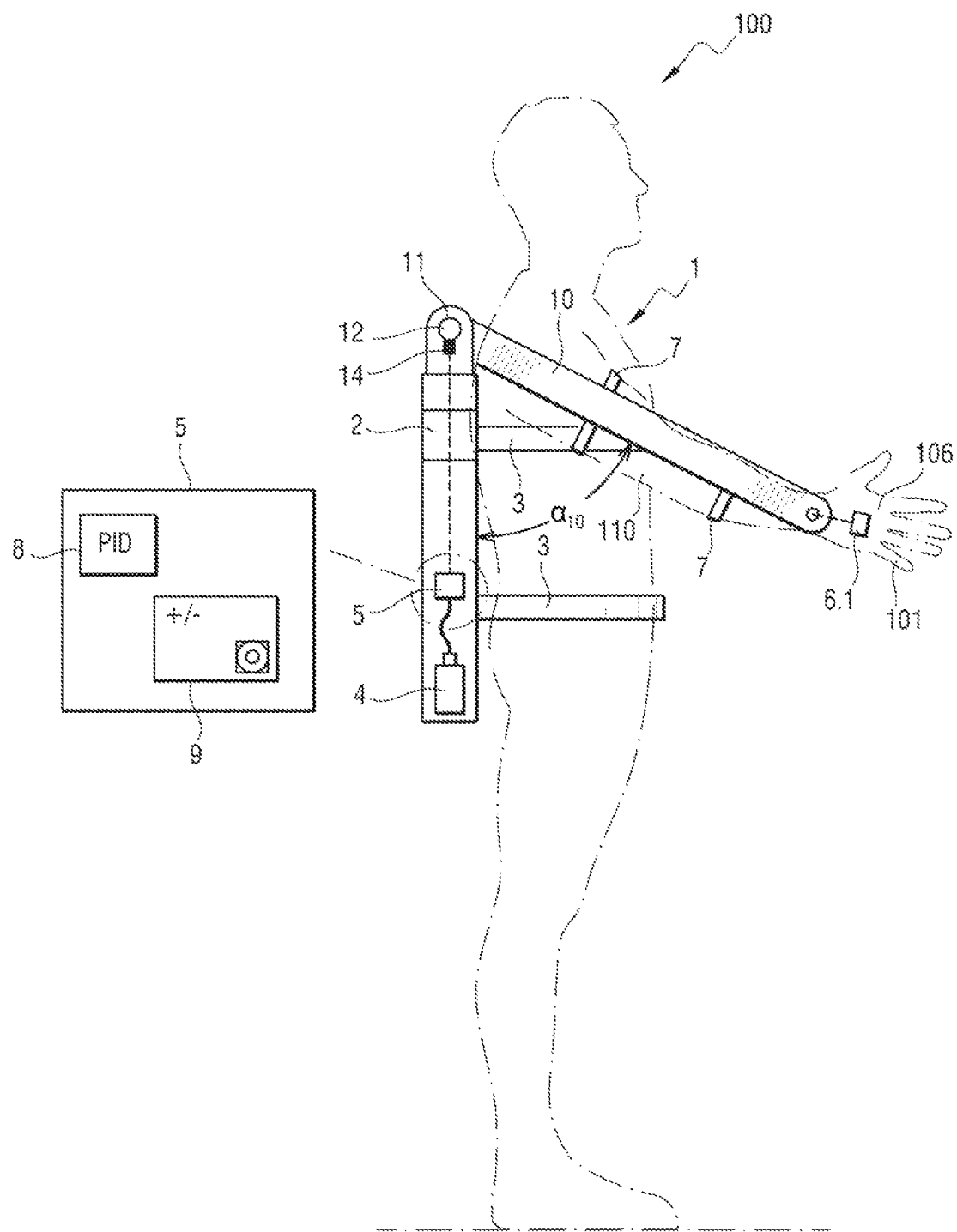
FIG. 1 is a diagrammatic side view of an exoskeleton in a first embodiment of the invention.
Figure 2:
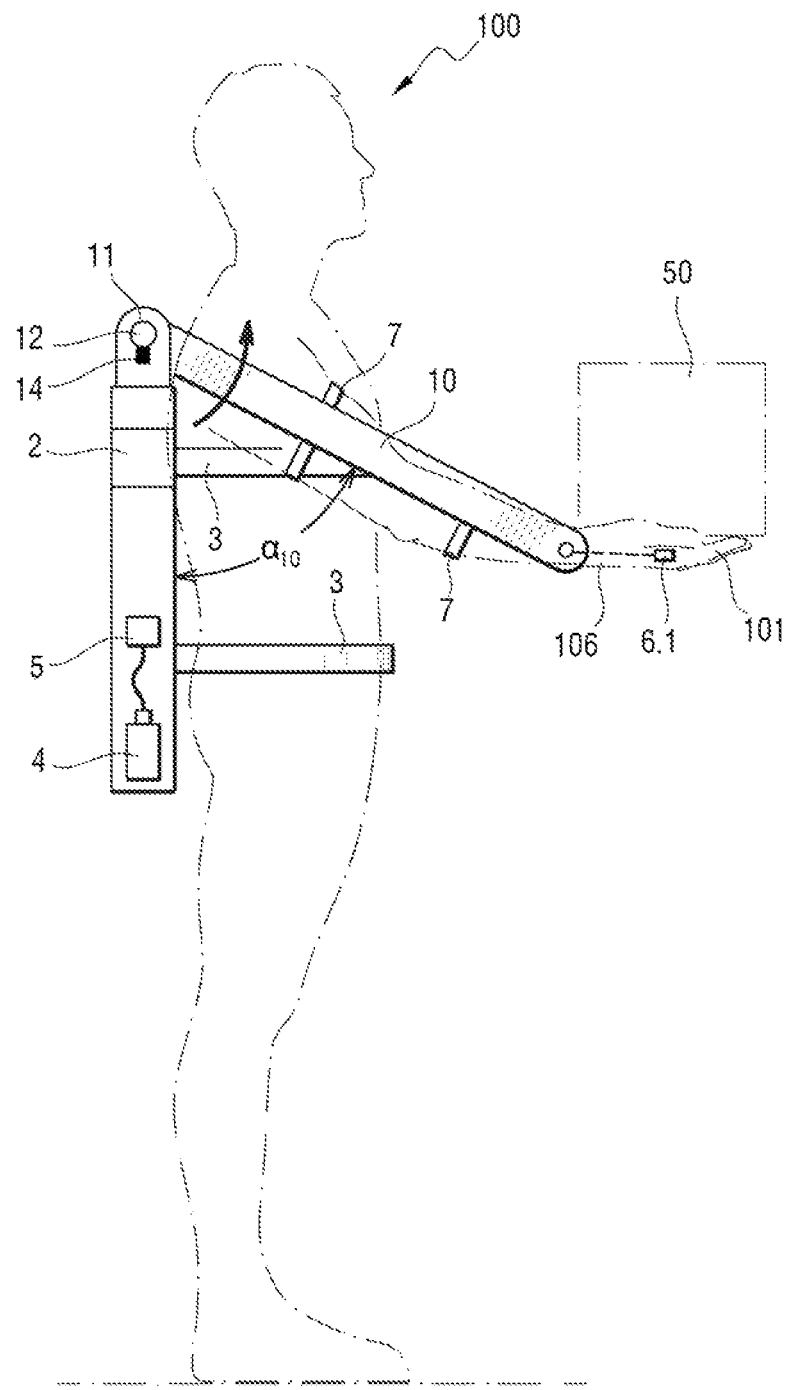
FIG. 2 is a diagrammatic view of the exoskeleton of FIG. 1 in a handling configuration.

With reference to FIGS. 1 and 2, an exoskeleton of the invention, given overall reference 1, includes a dorsal segment 2 provided with straps 3 for attaching it to a user 100. The dorsal segment includes a battery 4 powering a monitor and control unit 5. The exoskeleton 1 also includes a first arm segment 10 on the right that is hinged to the dorsal segment 2 by a first gearmotor 11. The first gearmotor 11 is provided with a first dot-based rotary encoder 12 and with a first sensor 14 for sensing the power supply current of the first gearmotor 11. The first arm segment 10 is connected to the right arm 110 of the user 100 by straps 7. A normally-open first palm contactor 6.1 for attaching to the palm 106 of the right hand 101 of the user 100 is connected to the monitor and control unit 5. The monitor and control unit 5 is also connected to the first encoder 12, to the first sensor 14, and to the first gearmotor 21, and it includes in particular a proportional-integral type speed corrector algorithm 8 together with a memory and calculation module 9.

In operation, when the user 100 uses the right hand 101 to grasp a load 50 for handling that is of unknown weight, the user puts the load on the palm 106 of the right-hand 101. The first palm contactor 6.1 changes from the open state to the closed state. The monitor and control unit 5 detects this change of state and interprets it as meaning that the user 100 intends to handle the load 50. For the first gearmotor 11, the monitor and control unit 5 then sets a first speed setpoint 13 of 5 degrees per second (°/s) in a direction for lifting the load 50 (in the example shown in FIGS. 1 and 2, turning upwards in a vertical plane), and the unit 5 servocontrols the first gearmotor 11 on the measurement from the encoder 12. The integral corrector algorithm 8 measures the error between the measurement from the first encoder 12 and the first setpoint 13 and it adjusts accordingly the control value $COM_{11}$ that is sent to the first gearmotor 11 by the monitor and control unit 5. Thus, so long as the first encoder 12 measures a speed of zero, the monitor and control unit 5 sends an increasing torque command to the first gearmotor 11. When the torque $C_{11}$ that is applied by the first gearmotor 11 to the first arm segment 10 exceeds the value of a threshold torque $C_s$, the first arm segment 10 moves and the first encoder 12 stores a non-zero speed $V_{11}$ for the first gearmotor 11. The value of the threshold torque $C_s$ corresponds to the resistance to turning the first gearmotor 11 as exerted essentially by the weight of the arm segment 10 and by the weight of the load 50 (and possibly also by part of the weight of the user's arm). When the speed $V_{11}$ reaches the value of a threshold speed $V_{s11}$—one meter per second (m/s) in this example the monitor and control unit 5 stores the value $COM_{s11}$ reached by the command $COM_{11}$ being sent to the first gearmotor 11. In this example, since the first gearmotor 11 is current controlled, the monitor and control unit 5 stores the value $I_{s11}$ reached by the power supply current I of the first gearmotor 11. This value $I_{s11}$ is measured using the sensor 14. Alternatively, when the first gearmotor 11 is controlled by a variable drive having a current loop, the value $I_{s11}$ corresponds to the setpoint being applied to the variable drive). Thereafter, the monitor and control unit 5 makes use of the value $I_{s11}$ to determine an estimate $M_{50es}$ for the weight of the load 50. By way of example, this determination may be performed using a curve associating the power supply current $I_{11}$ of the first gearmotor 11 with the available torque developed by the first gearmotor 11. The torque $C_{s11}$ corresponding to the current $I_{s11}$ is then divided by the length $L_{10}$ of the first arm segment 10, possibly weighted by the cosine of the angle $\alpha_{10}$ between the dorsal segment 2 and the first arm segment 10, thereby enabling an estimate $M_{50es}$ to be deduced for the weight of the load 50. This estimate $M_{50es}$ is stored in the module 9 and is then used by the module 9 to set up a force servocontrol relationship that determines the commands to be applied to the first gearmotor 11 by the monitor and control unit 5. This relationship is used to control the first gearmotor 11 while handling the load 50.

When the user 100 desires to put down the load 50, the user places it on a destination support and the first palm contactor 6.1 changes from the closed state to the open state. The monitor and control unit 5 then detects that the intention to handle the load 50 has ceased and it proceeds to reset to zero the value for the estimate $M_{50es}$ of the weight of the load 50 stored in the module 9.

A control method is thus obtained that enables the unknown weight of the load 50 for handling by a first gearmotor 11 to be estimated, and that then enables the first gearmotor 11 to be controlled while using an estimate $M_{50es}$ for the unknown weight of the load 50 for handling.

In the following description of the second, third, fourth, fifth, sixth, seventh, eighth, and ninth embodiments of the invention, elements that are identical or analogous to those described above are given identical numerical references.

Figure 3:
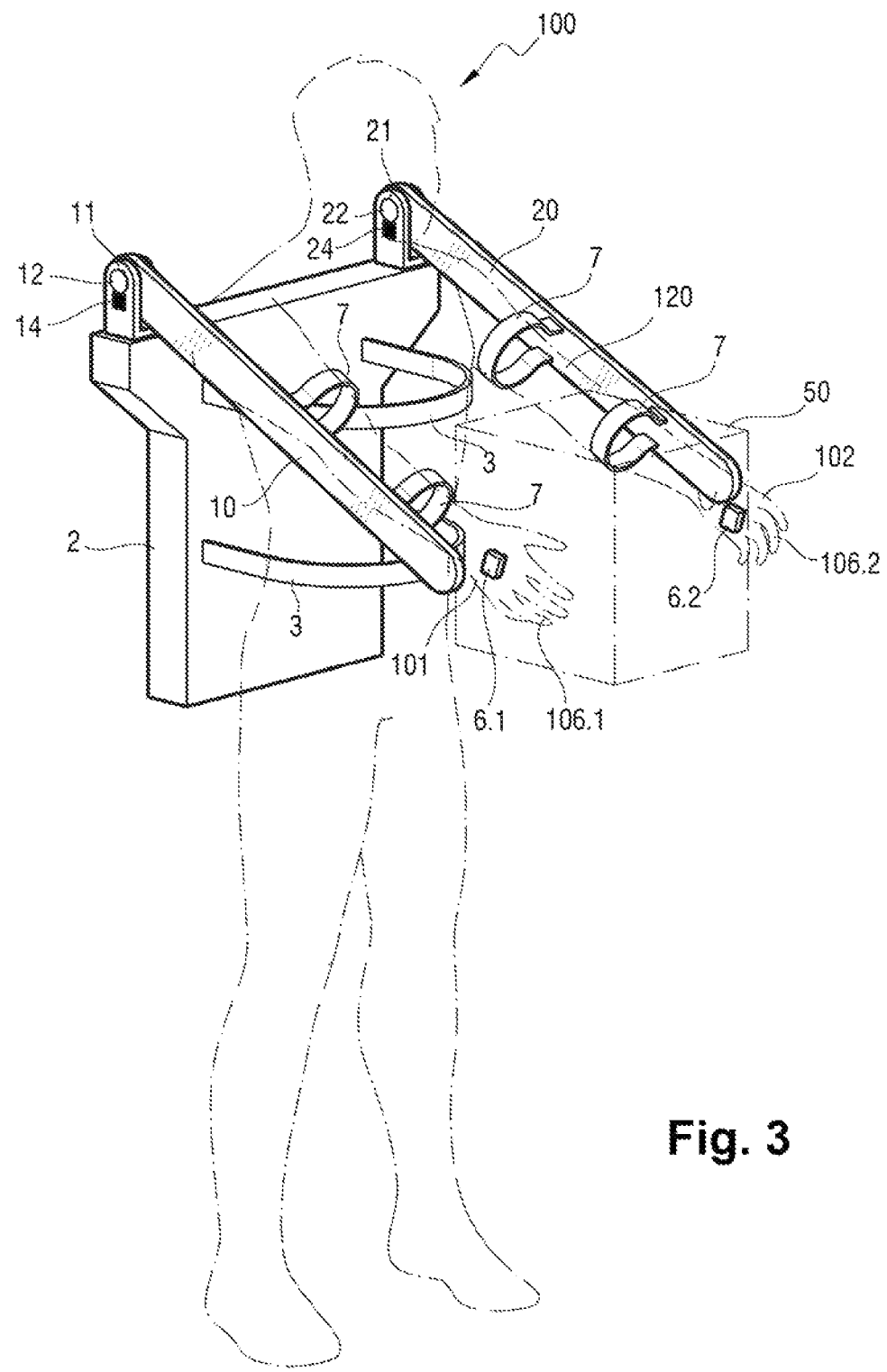
FIG. 3 is a diagrammatic perspective view of an exoskeleton in a second embodiment of the invention.

With reference to FIG. 3, the exoskeleton 1 also includes a left arm segment 20 hinged to the dorsal segment 2 via a second gearmotor 21. The second gearmotor 21 is provided with a second dot-based rotary encoder 22 and with a second sensor 24 for sensing the power supply current of the second gearmotor 21. The left arm segment 20 is connected to the left arm 120 of the user 100 by straps 7. A normally-open second palm contactor 6.2 for attaching to the palm 106.2 of the left hand 102 of the user 100 is connected to the monitor and control unit 5. The monitor and control unit 5 is also connected to the second gearmotor 21, to the second encoder 22, and to the second sensor 24.

In operation, when the user 100 uses both the right hand 101 and the left hand 102 to grasp a load 50, the user grips the load 50 between the palm 106.1 of the right hand 101 and the palm 106.2 of the left hand 102. The first palm contactor 6.1 and the second palm contactor 6.2 then both change from the open state to the closed state. The monitor and control unit 5 detects these changes of state and interprets them as meaning that the user 100 intends to handle the load 50. For the first gearmotor, the monitor and control unit 5 then sets a first speed setpoint 13 of 5°/s in a direction for lifting the load 50 (in the example shown in FIG. 3, turning upwards in a vertical plane), and the unit 5 servocontrols the first gearmotor 11 to the measurement from the encoder 12. For the second gearmotor 21, the monitor and control unit 5 then also sets a second speed setpoint 23 of 5°/s in a direction for lifting the load 50 (in the example shown in FIG. 3, turning upwards in a vertical plane), and the unit 5 servocontrols the second gearmotor 21 to the measurement from the encoder 22.

When the torque $C_{11}$ that is applied by the first gearmotor 11 to the first arm segment 10 exceeds the value of a first threshold torque $C_s$, the arm segment 10 moves and the first encoder 12 senses a non-zero speed $V_{11}$ for the first gearmotor 11. The monitor and control unit 5 maintains and stores the value $COM_{s11}$ reached by the command $COM_{11}$ sent to the first gearmotor 11. When the torque $C_{21}$ applied by the second gearmotor 21 to the second arm segment 20 exceeds the value of a second threshold torque $C_{s21}$, the second arm segment 20 moves and the second encoder 22 stores a non-zero speed $V_{21}$ for the second gearmotor 21. The monitor and control unit 5 maintains and stores the value $COM_{s21}$ reached by the command $COM_{21}$ sent to the second gearmotor 21.

In this example, since the first and second gearmotors 11 and 12 are current controlled, the monitor and control unit 5 stores the first value $I_{s11}$ reached by the power supply current $I_{11}$ of the first gearmotor 11 and the second value $I_{s21}$ reached by the power supply current $I_{21}$ of the second gearmotor 21. These values are measured by using the first sensor 14 and the second sensor 24. Thereafter, the monitor and control unit 5 makes use of the first value $I_{s11}$ and of the second value $I_{s21}$ to determine an estimate $M_{50es}$ for the weight of the load 50. This estimate $M_{50es}$ is stored in the module 9 and is then used by the module 9 to set up a force servocontrol relationship that determines the commands to be applied to the first gearmotor 11 and to the second gearmotor 21 by the monitor and control unit 5.

When the load 50 is balanced, its weight is shared in substantially equal manner between the first arm segment 10 and the second arm segment 20. Under such circumstances, the first threshold torque $C_{s11}$ is substantially equal to the second threshold torque $C_{s21}$ and these values are reached at substantially the same time when the first gearmotor 11 and the second gearmotor 21, and also the first arm segment 10 and the second arm segment 20 have characteristics that are substantially identical.

When the load 50 is not balanced, the forces to be delivered by the first gearmotor 11 and by the second gearmotor 21 are different, and they might not be reached at the same time. This unbalance of the load 50 gives rise to a difference between the first torque threshold $C_{s11}$ and the second torque threshold $C_{s21}$, which difference is taken into account by the module 9 while setting up the force servocontrol relationship that determines the commands to be applied to the first gearmotor 11 and to the second gearmotor 21 by the monitor and control unit 5.

When the user 100 seeks to put down the load 50, the user places it on a destination support. When the user 100 lets go of the load 50, the first palm contactor 6.1 and the second palm contactor 6.2 both change from the closed state to the open state. The monitor and control unit 5 then detects that the intention to handle the load 50 has ceased and it proceeds to reset to zero the value for the estimate $M_{50es}$ of the weight of the load 50 stored in the module 9.

Figure 4:
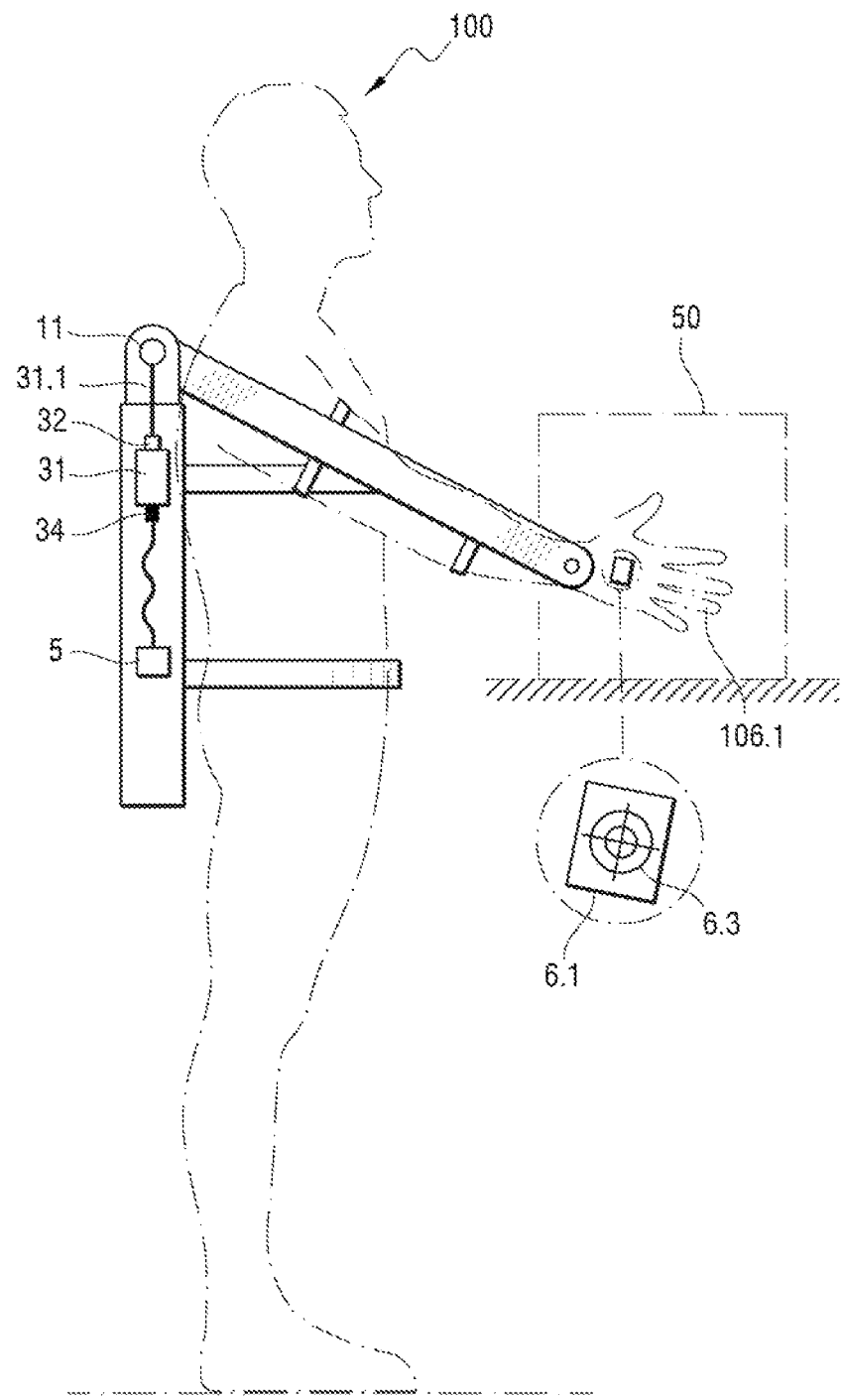
FIG. 4 is a diagrammatic side view of an exoskeleton in a third embodiment of the invention.

With reference to FIG. 4, the exoskeleton 1 also includes a third gearmotor 31 having its outlet axis 31.1 orientated substantially vertically when the user is in a vertical position. The outlet axis 31.1 of the third gearmotor 31 is connected to the first arm segment 10 and it serves to impart a turning torque about a vertical axis to the first arm segment 10. The third gearmotor 31 is provided with a third dot-based rotary encoder 32 and with a third sensor 34 for sensing the power supply current of the third gearmotor 31. The first palm contactor 6.1 also includes a first inertial unit 6.3 for detecting the orientation of the first palm contactor 6.1.

In operation, when the user 100 seeks to use the right hand 101 to move the load 50 for handling, the user applies the palm 106.1 against the load 50. The first palm contactor 6.1 changes from the open state to the closed state. The monitor and control unit 5 detects this change of state and interprets it as meaning that the user 100 intends to handle the load 50. The information coming from the first inertial unit 6.3 indicates that the intention of the user 100 is to move the load 50 in a horizontal plane, from right to left as seen by the user 100. For the third gearmotor 31, the monitor and control unit 5 then sets up a third speed setpoint 33 of 5°/s in a direction seeking to move the load 50 towards the left of the user 100, and the unit 5 servocontrols the third gearmotor 31 on the measurement from the encoder 32. When the torque $C_{31}$ that is applied by the third gearmotor 31 to the first arm segment 10 exceeds the value of a third threshold torque $C_{s31}$, the first arm segment 10 moves and the third encoder 32 senses a non-zero speed $V_{31}$ for the third gearmotor 31. The value of the torque threshold $C_{s31}$ corresponds to the opposition to rotation of the third gearmotor 31 that is being exerted essentially by the weight of the load 50 and by static friction against its support. When the third encoder 32 detects a non-zero speed $V_{31}$, the monitor and control unit 5 stores the value $COM_{s31}$ reached by the command $COM_{31}$ sent to the third gearmotor 31. In this example, since the third gearmotor 31 is current controlled, the monitor and control unit 5 stores the value $I_{s31}$ reached by the power supply current $I_{31}$ of the third gearmotor 31. This value is measured using the third sensor 34. Thereafter, the monitor and control unit 5 makes use of the value $I_{s31}$ to determine an estimate $R_{50es}$ for the opposing force exerted by the load 50. This estimate $R_{50es}$ is stored in the module 9 and is then used by the module 9 to set up a force servocontrol relationship that determines the commands to be applied to the third gearmotor 31 by the monitor and control unit 5.

Figure 5:
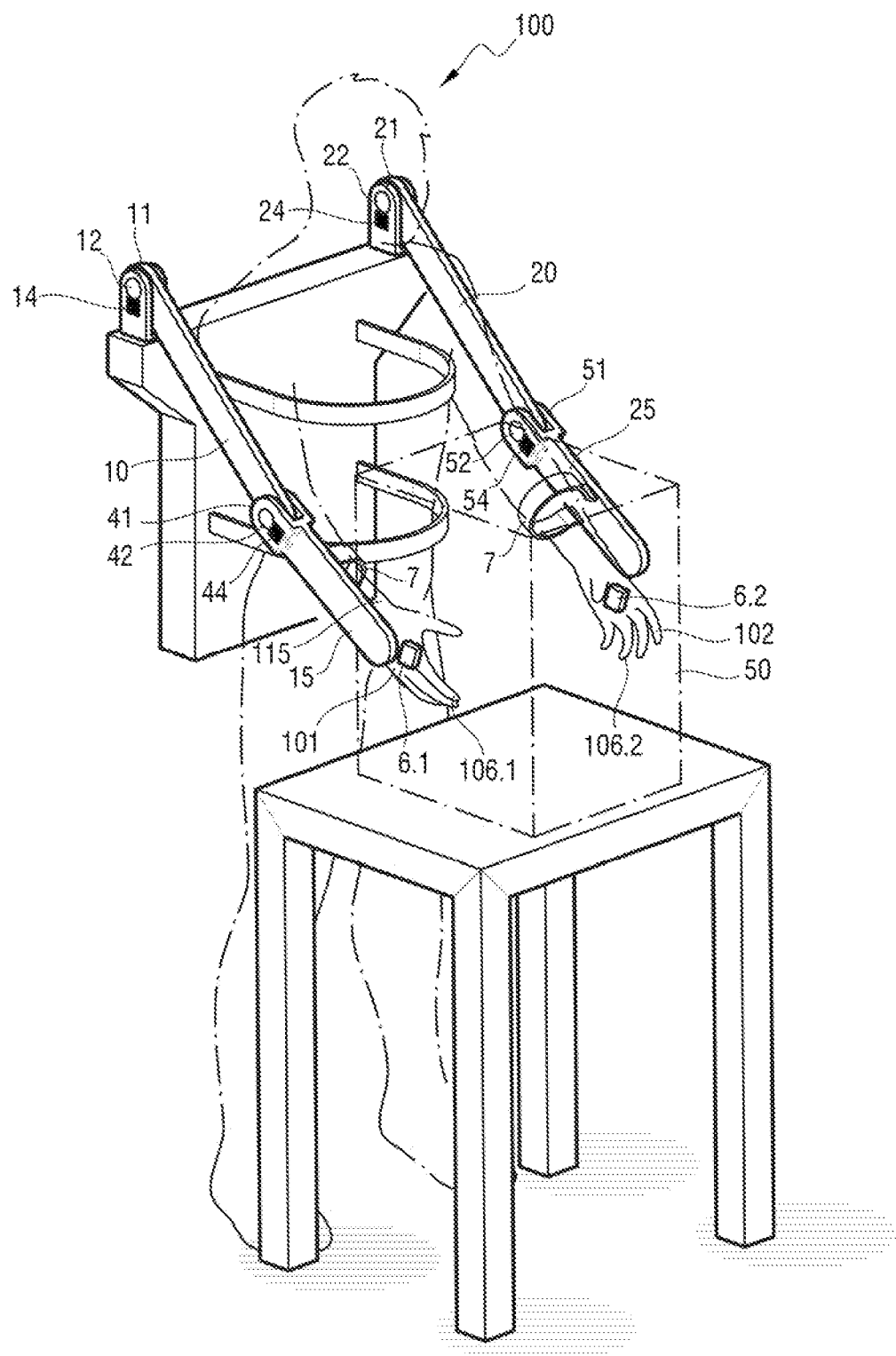
FIG. 5 is a diagrammatic perspective view of an exoskeleton in a fourth embodiment of the invention.

With reference to FIG. 5, the first arm segment 10 receives a first forearm segment 15 that is hinged to the end of the first arm segment 10 by a fourth gearmotor 41. The fourth gearmotor 41 is provided with a fourth dot-based rotary encoder 42 and with a fourth sensor 44 for sensing the power supply current of the fourth gearmotor 41, all connected to the monitor and control unit 5. The first forearm segment 15 is connected to the right forearm 115 of the user 100 by straps 7.

In corresponding manner, the second arm segment 20 receives a second forearm segment 25 hinged to the end of the second arm segment 20 on the left by a fifth gearmotor 51 connected to the monitor and control unit 5. The fifth gearmotor 51 is provided with a fifth dot-based rotary encoder 52 and with a fifth sensor 54 for sensing the power supply current of the fifth gearmotor 51.

In operation, when the user 100 uses both the right hand 101 and the left hand 102 to grasp a load 50, the user grips the load 50 between the palm 106.1 of the right hand 101 and the palm 106.2 of the left hand 102. The first palm contactor 6.1 and the second palm contactor 6.2 both change from the open state to the closed state. The monitor and control unit 5 detects these changes of state and interprets them as meaning that the user 100 intends to handle the load 50. The monitor and control unit 5 then sets a first speed setpoint 13 of 10 centimeters per second (cm/s) in a direction seeking to lift the load 50. The monitoring control unit 5 then performs servocontrol in three-dimensional (or "operating") space, and using the models of the exoskeleton it calculates the torques to be sent as respective setpoints to the first gearmotor 11, to the second gearmotor 21, to the fourth gearmotor 41, and to the fifth gearmotor 51 (in this example, all being rotations or torques in the vertical plane of FIG. 5). The monitoring control unit 5 uses the values from the encoders 12, 22, 42, and 52 to calculate the three-dimensional positions and speeds of the wrists, thereby performing servocontrol in three dimensions. The monitor and control unit 5 then also acts to manage the coupling between the axes and to ensure that the speed of 10 cm/s for the load is indeed complied with. For the monitor and control unit 5, a simpler alternative for controlling the fourth gearmotor 41 and the fifth gearmotor 51 would be to block any rotation of the fourth gearmotor 41 and of the fifth gearmotor 51, or to perform simple dynamic coupling by using the values from the encoders 12 and 22.

The monitor and control unit then monitors the signals coming from the first encoder 12, the second encoder 22, the fourth encoder 42, and the fifth encoder 52. When the first encoder 12 and/or the fourth encoder 42 detects movement, the monitor and control unit 5 maintains and stores the value $COM_{s11}$ reached by the command $COM_{11}$ sent to the first gearmotor 11, and the value $COM_{s41}$ reached by the command $COM_{41}$ sent to the fourth gearmotor 41.

When the second encoder 22 and/or the fifth encoder 52 detects movement, the monitor and control unit 5 maintains and stores the value $COM_{s21}$ reached by the command $COM_{21}$ sent to the second gearmotor 21, and the value $COM_{s51}$ reached by the command $COM_{51}$ sent to the fifth gearmotor 51. On the basis of the values of the commands $COM_{s11}$, $COM_{s41}$, $COM_{s21}$, and $COM_{s51}$, the monitor and control unit 5 determines an estimate $M_{50es}$ of the weight of the load 50 (or else $M_{50es}$ multiplied by the lever arm if the value of the lever arm is unknown), e.g. using a model of the exoskeleton 1. This estimate $M_{50es}$ is stored in the module 9 and is then used by the module 9 to set up a force servocontrol relationship that determines the commands to be applied to the first gearmotor 11, to the second gearmotor 21, to the fourth gearmotor 41, and to the fifth gearmotor 51 by the monitor and control unit 5.

When the user 100 seeks to put down the load 50, the user places it on a destination support. When the user 100 lets go of the load 50, the first palm contactor 6.1 and the second palm contactor 6.2 both change from the closed state to the open state. The monitor and control unit 5 then detects that the intention to handle the load 50 has ceased and it proceeds to reset to zero the value for the estimate $M_{50es}$ of the weight of the load 50 stored in the module 9.

Figure 6:
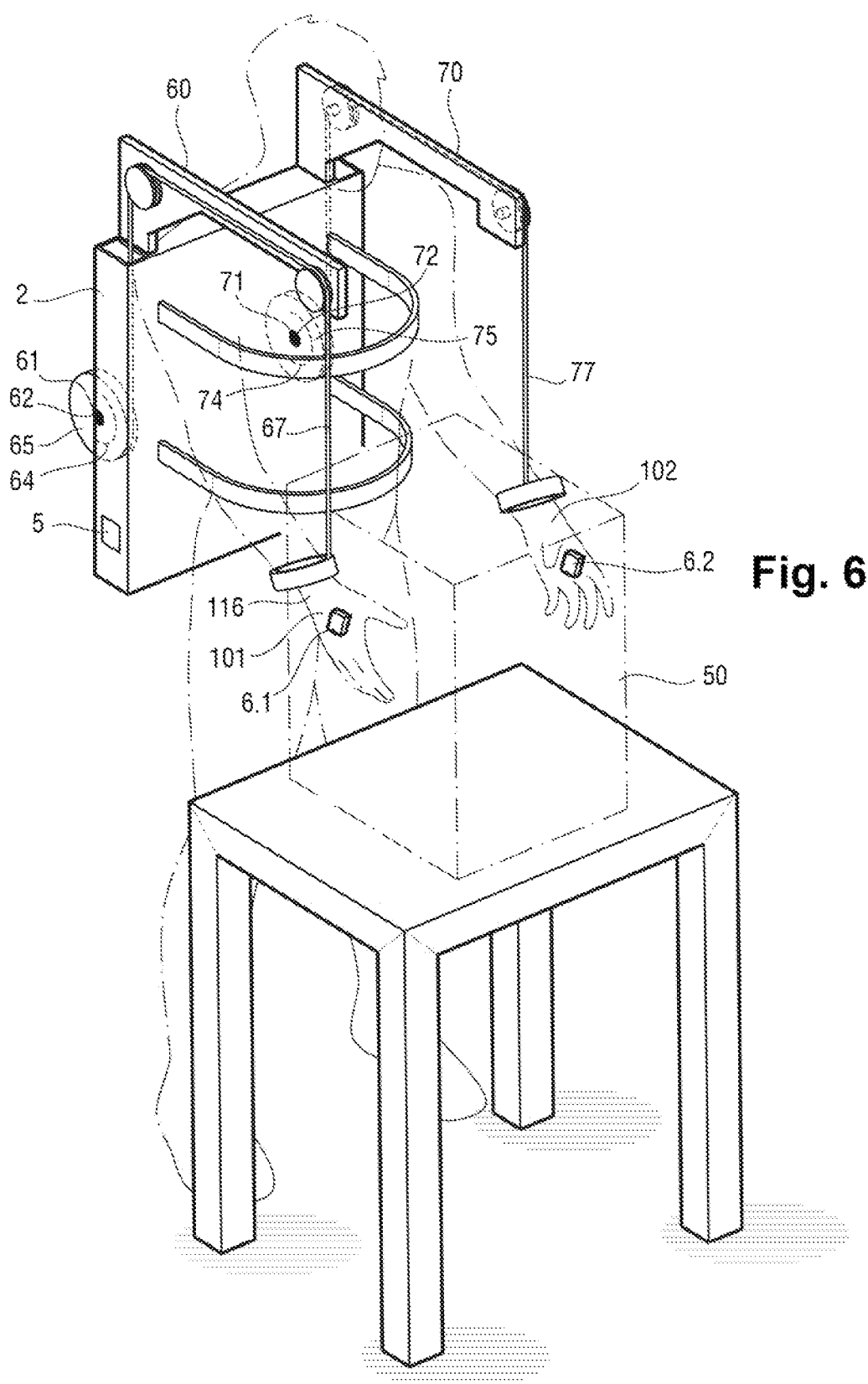
FIG. 6 is a diagrammatic perspective view of an exoskeleton in a fifth embodiment of the invention.

With reference to FIG. 6, the dorsal segment 2 of the exoskeleton 1 includes a first bracket 60 and a sixth gearmotor 61 for winding a first cable 66 around a first drum 65, the first cable 66 having a first end 67 that is connected to the right wrist 116 of the user 100. The sixth gearmotor 61 is provided with a sixth dot-based rotary encoder 62, and with a sixth sensor 64 for sensing output torque from the sixth gearmotor 61, all connected to the monitor and control unit 5. In corresponding manner, the dorsal segment 2 of the exoskeleton 1 includes a second bracket 70 and a seventh gearmotor 71 for winding a second cable 76 about a second drum 75, the second cable 76 having a second end 77 that is connected to the left wrist 117 of the user 100. The seventh gearmotor 71 is provided with a seventh dot-based rotary encoder 72, and with a seventh sensor 74 for sensing the output torque of the seventh gearmotor 71, all connected to the monitor and control unit 5.

In operation, when the user 100 uses both the right hand 101 and the left hand 102 to grasp a load 50, the user grips the load 50 between the palm 106.1 of the right hand 101 and the palm 106.2 of the left hand 102. The first palm contactor 6.1 and the second palm contactor 6.2 both change from the open state to the closed state. The monitor and control unit 5 detects these changes of state and interprets them as meaning that the user 100 intends to handle the load 50. The monitor and control unit 5 then applies to the sixth gearmotor 61 an increasing torque command 63 in a direction seeking to lift the load 50 (in this example rotation of the sixth gearmotor 61 in a positive direction). This command may be in the form of increasing the output torque from the sixth gearmotor 61 by 1 newton meter per second (Nm/s). The monitor and control unit 5 also applies to the seventh gearmotor 71 an increasing torque command 73 in a direction seeking to lift the load 50 (in this example rotation of the seventh gearmotor 71 in a positive direction). This command may be in the form of increasing the output torque from the seventh gearmotor 71 by 1 Nm/s.

When the force $F_{61}$ applied by the sixth gearmotor 61 to the first cable 66 exceeds the value of a sixth force threshold $F_{s61}$, the first drum 65 moves and the sixth encoder 62 stores a non-zero speed $V_{61}$ for the sixth gearmotor 61. The monitor and control unit 5 then stores and maintains the value $C_{61}$ for the output torque of the sixth gearmotor 61 as sensed by the sixth sensor 64. When the force $F_{71}$ applied by the seventh gearmotor 71 to the second cable 76 exceeds the value of a seventh force threshold $F_{s71}$, the second drum 75 moves and the seventh encoder 72 stores a non-zero speed $V_{71}$ for the seventh gearmotor 71. The monitor and control unit 5 then stores and maintains the value $C_{71}$ for the output torque of the seventh gearmotor 71 as sensed by the seventh sensor 74.

Thereafter, the monitor and control unit 5 makes use of the values $C_{61}$ and $C_{71}$ of the output torque to determine an estimate $M_{50es}$ for the weight of the load 50. This estimate $M_{50es}$ may be obtained by dividing the measured value $C_{61}$ for the output torque of the first gearmotor 61 by the radius of the first drum 65, and the measured value $C_{71}$ for the output torque of the second gearmotor 71 by the radius of the second drum 75. The estimate $M_{50es}$ is stored in the module 9 and is then used by the module 9 for setting up a force servocontrol relationship that determines the commands to be applied to the sixth gearmotor 61 and to the seventh gearmotor 71.

Figure 11:
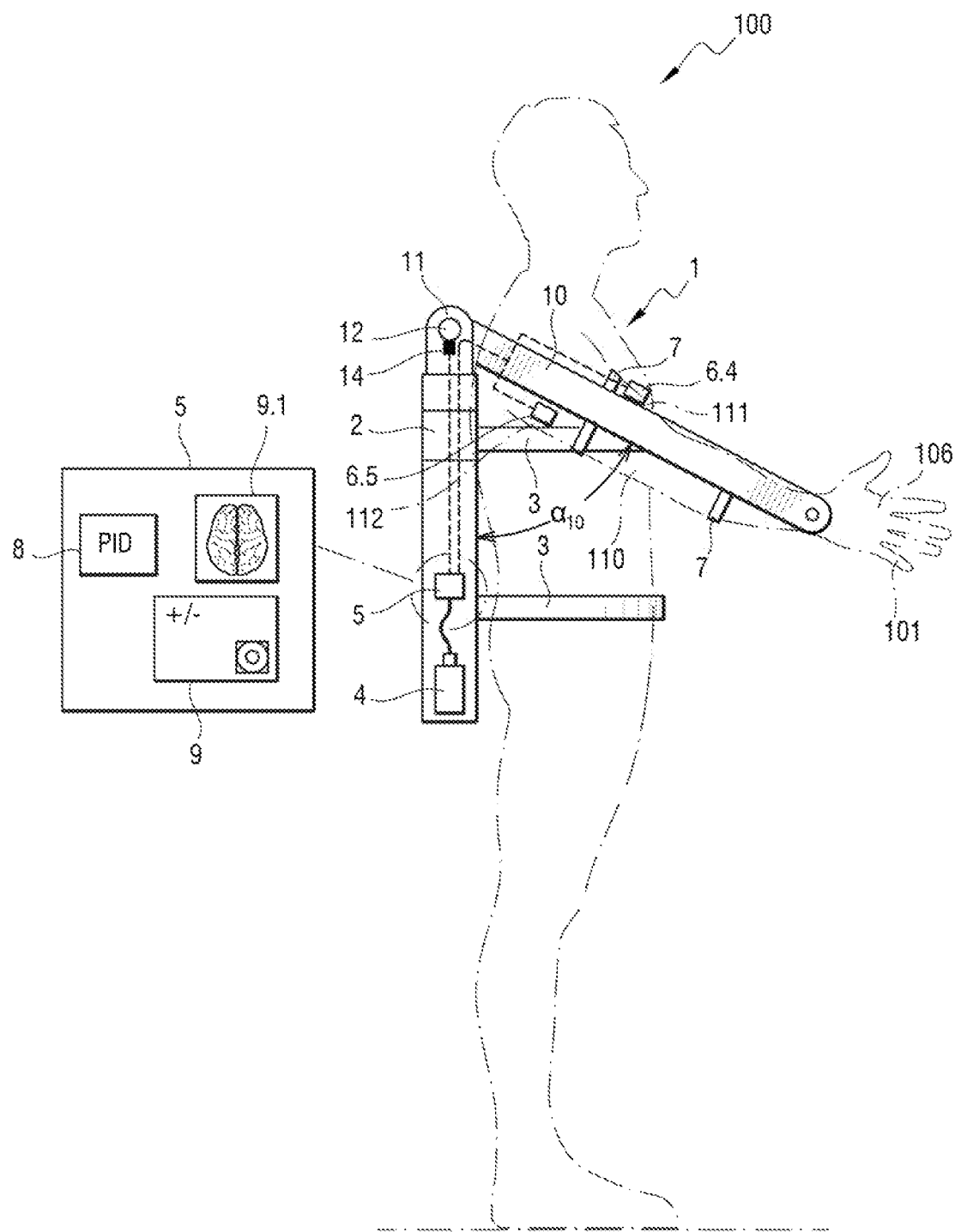
FIG. 11 is a diagrammatic side view of a cobot in a tenth embodiment of the invention.

In a tenth embodiment shown in FIG. 11, but that is applicable to all of the above-described arm architectures), the exoskeleton 1 includes a first myoelectrical sensor 6.4 placed on the biceps 111 of the right arm 110 of the user 100, and a second myoelectrical sensor 6.5 placed on the triceps 112 of the user 100. The first and second myoelectrical sensors 6.4 and 6.5 are connected to a neural network based artificial intelligence module 9.1 of the monitor and control unit 5.

In operation, when the user 100 seeks to lift the load 50 for handling of unknown weight, the user grasps it and contracts the biceps 111 of the right arm 110 in order to apply a lifting force to the load 50. The contraction of the biceps 111 is greater than the contraction would be caused by moving the right arm 110 without a load. The biological signature specific to a movement of a loaded right arm 110, and that is representative of an intention to lift the load 50, is detected by the first myoelectrical sensor 6.4. The module 9.1 analyzes the signal transmitted by the first myoelectrical sensor 6.4 and identifies an intention to handle the load 50. For the first gearmotor 11, the monitor and control unit 5 then sets a first speed setpoint 13 of 5°/s in a direction for lifting the load 50 (in the example shown in FIG. 11, turning upwards in a vertical plane), and the unit 5 servocontrols the first gearmotor 11 to the measurement from the encoder 12. The integral corrector algorithm 8 measures the error between the measurement from the first encoder 12 and the first setpoint 13 and it adjusts accordingly the control value $COM_{11}$ that is sent to the first gearmotor 11 by the monitor and control unit 5. Thus, so long as the first encoder 12 measures a speed of zero, the monitor and control unit 5 sends an increasing torque command to the first gearmotor 11. When the torque $C_{11}$ applied by the first gearmotor 11 to the first arm segment 10 exceeds the value of a threshold torque $C_s$, the arm 10 of the exoskeleton 1 then takes up a fraction of the weight of the load 50 such that the user 100 ceases to apply a lifting force. This results in a reduction in the contraction of the biceps 111, which is detected by the first myoelectrical sensor 6.4. The module 9.1 analyzes the signal transmitted by the first myoelectrical sensor 6.4 and determines that the intention to handle the load 50 has ceased. The monitor and control unit 5 then stores the value of the torque $C_{11}$ applied to the gearmotor 11 and then makes an estimate $M_{50es}$ of the weight of the load 50, in the same manner as for the above-described embodiments. This estimate $M_{50es}$ is stored in the module 9 and is then used by the module 9 to set up a force servocontrol relationship that determines the commands to be applied to the first gearmotor 11 by the monitor and control unit 5. This relationship is used to control the first gearmotor 11 during subsequent handling of the load 50.

When the user seeks to put down the load 50, the myoelectrical signatures detected by the first and second myoelectrical sensors 6.4 and 6.5 are sent to the module 9.1 that, on analyzing them, detects a combination of signals representative of an intention to put down the load 50. Making use of the signals coming from the second myoelectrical sensor 6.5 is particularly effective for identifying the intention to put down the load 50. The monitor and control unit 5 then resets to zero the value of the estimate $M_{50es}$ for the weight of the load 50 as stored in the module 9.

Advantageously, the first and second myoelectrical sensors 6.4 and 6.5 are used in addition to the other sensors for sensing the intention to lift and/or put down the load as described for the above embodiments in order to improve the robustness of control.

Naturally, the invention is not limited to the embodiments described, but covers any variant coming within the ambit of the invention as defined by the claims.

Figure 7:
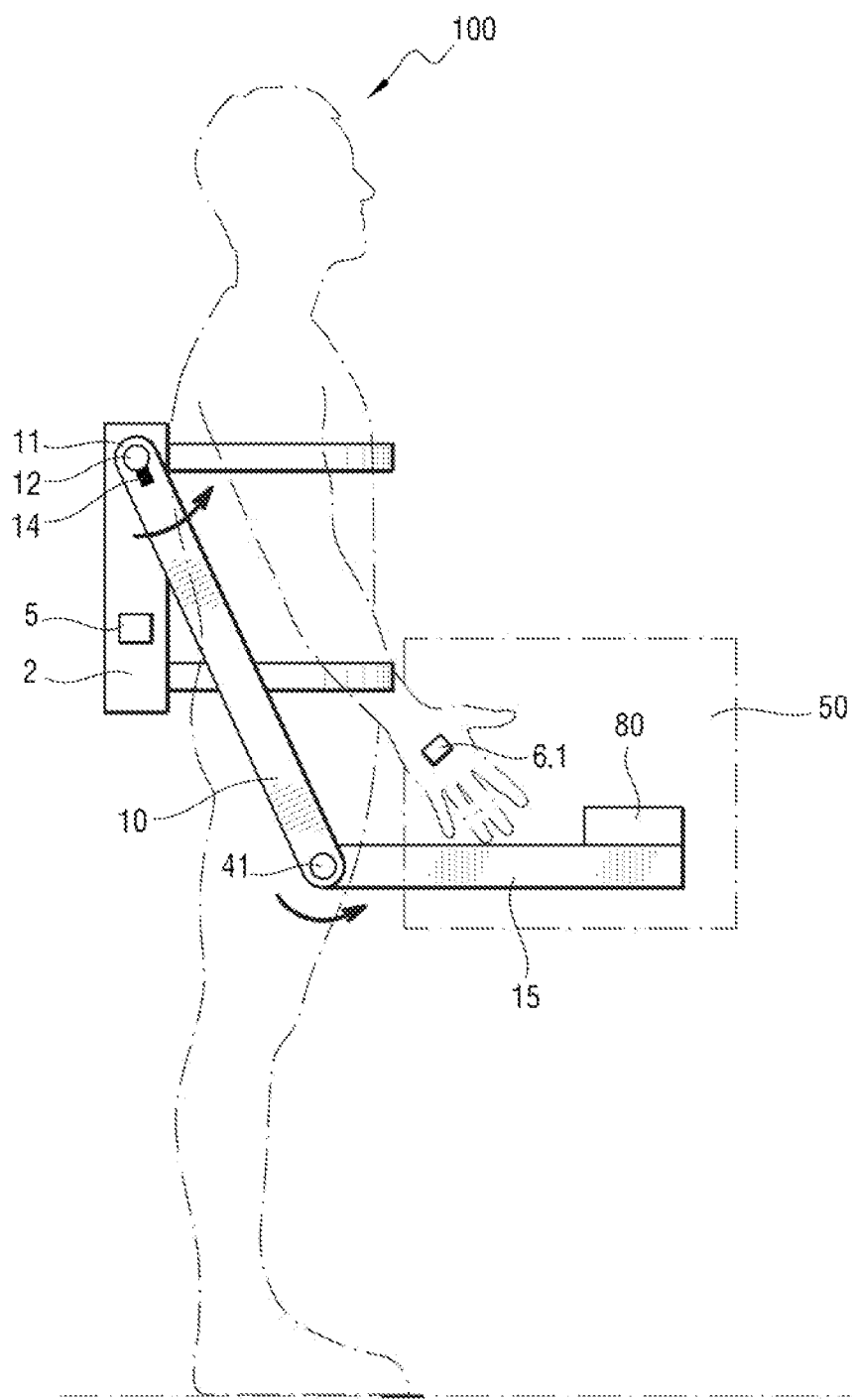
FIG. 7 is a diagrammatic side view of an exoskeleton in a sixth embodiment of the invention.
Figure 8:
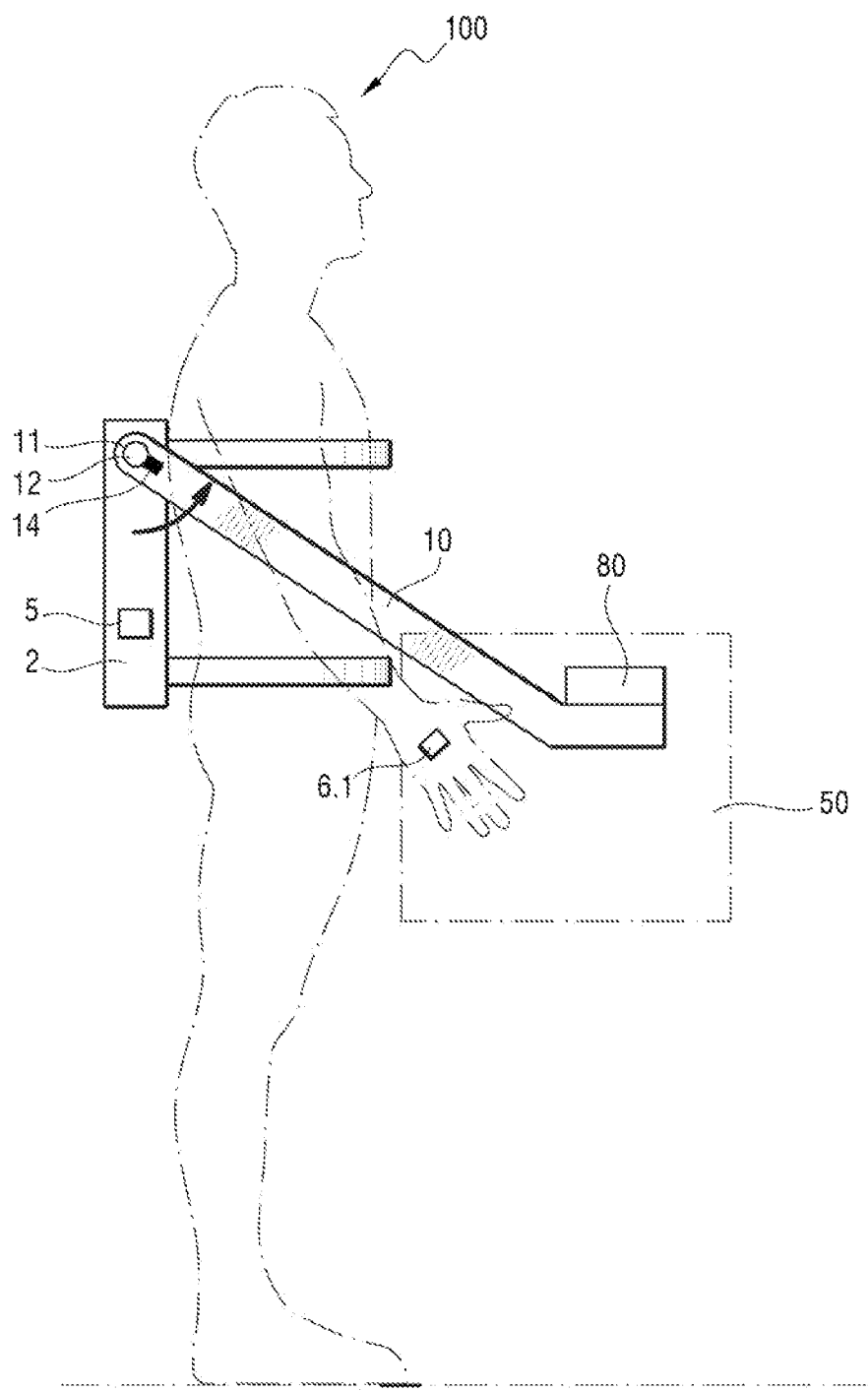
FIG. 8 is a diagrammatic side view of an exoskeleton in a seventh embodiment of the invention.
Figure 9:
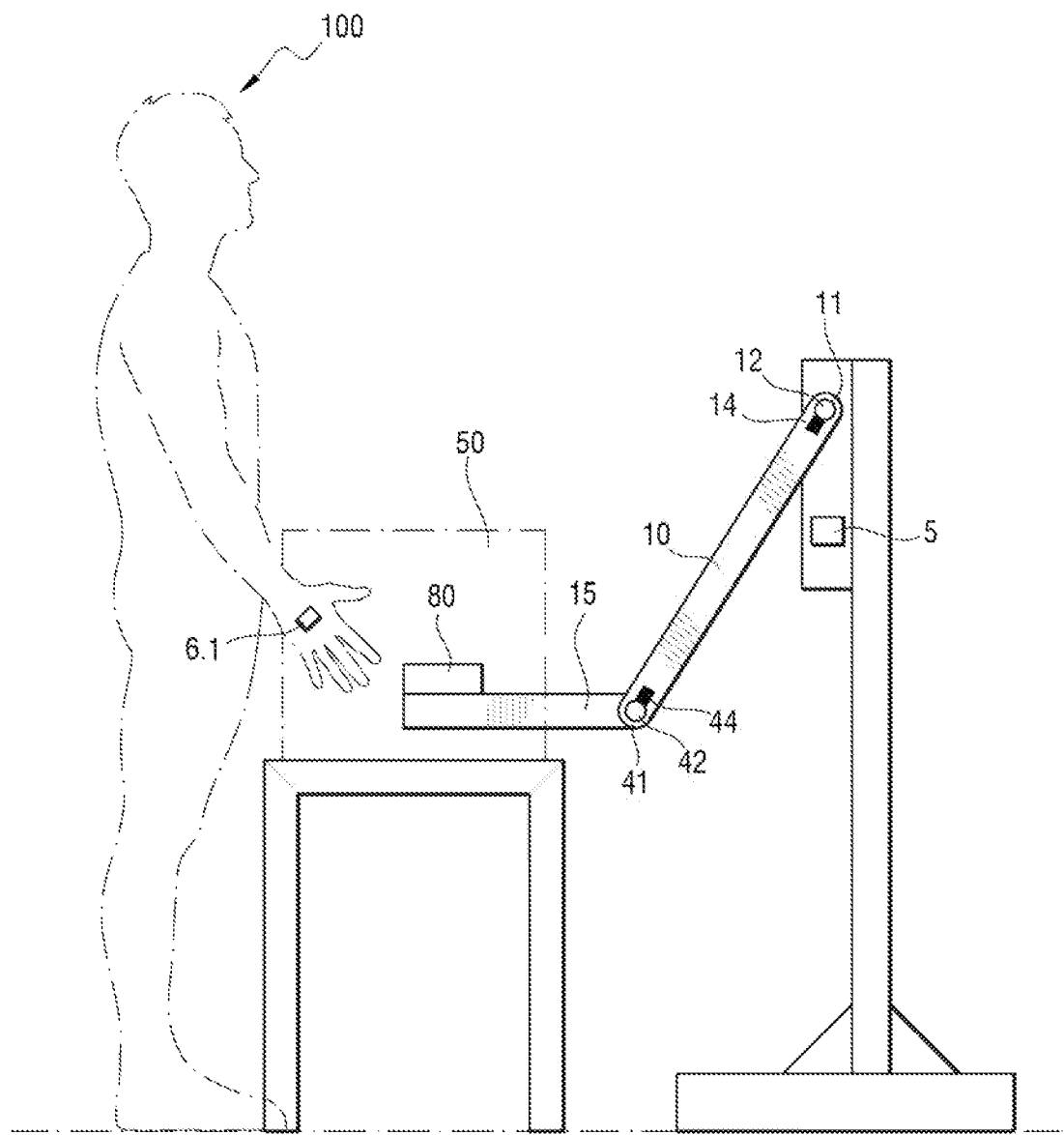
FIG. 9 is a diagrammatic side view of a cobot in an eighth embodiment of the invention.
Figure 10:
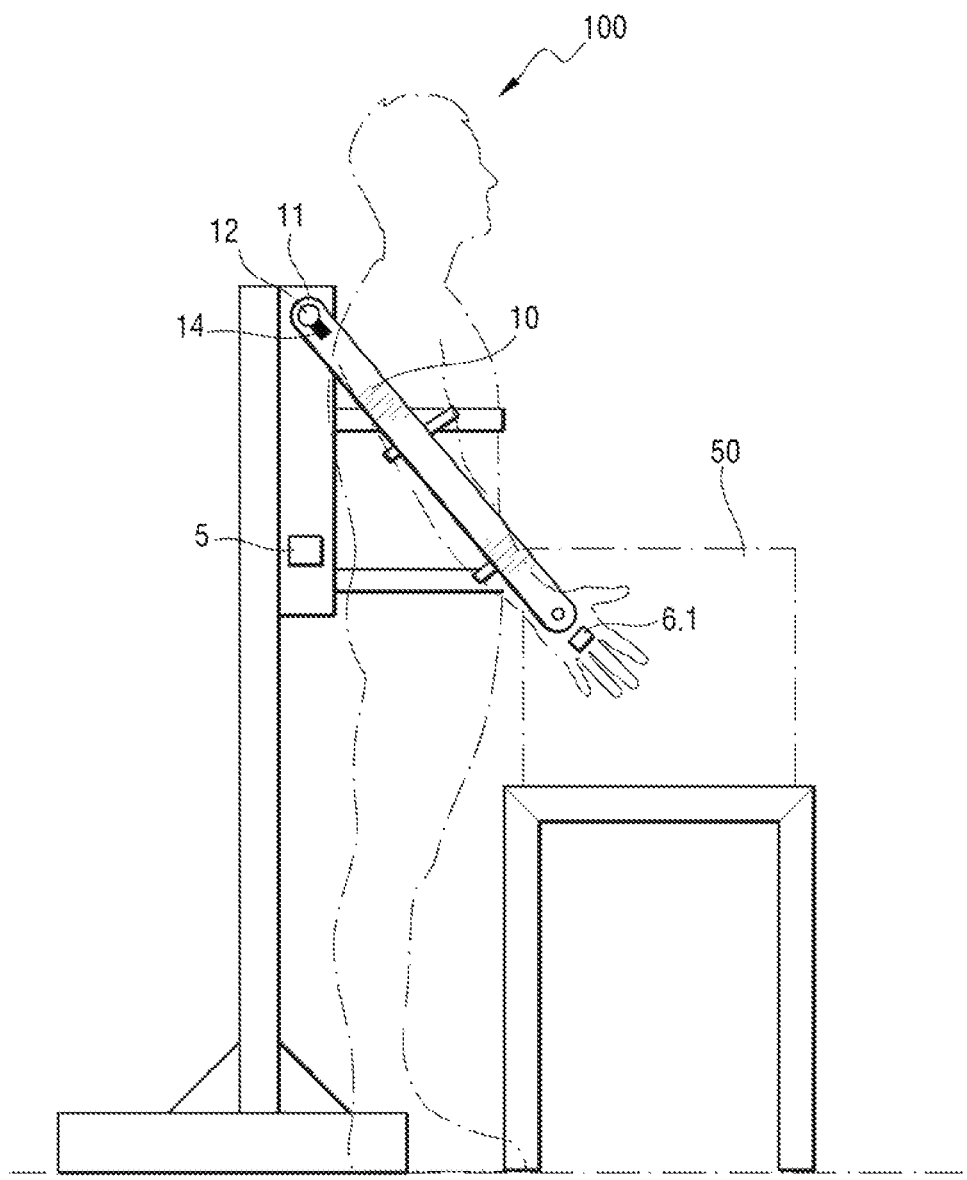
FIG. 10 is a diagrammatic side view of a cobot in a ninth embodiment of the invention.

In particular;
- although, above, the load 50 is connected to the exoskeleton via the hands of the user 100, the invention applies equally to the load 50 being connected directly to the exoskeleton, e.g. using gripper pads 80 (FIGS. 7 and 8) or forks;
- although, above, the arm segment of the exoskeleton is connected to the arm of the user, the invention applies equally to an arm segment that is not connected to the user (FIGS. 7 and 8);
- although, above, the invention is described with reference to an exoskeleton worn by a user, the invention applies equally to other types of cobot, e.g. such as fixed-base load handlers with grasping in parallel (FIG. 9) or with grasping by the user (FIG. 10);
- although, above, the exoskeleton includes a gearmotor, the invention applies equally to actuators of other types, e.g. such as cable jacks, or hydraulic, pneumatic, or electrical linear actuators;
- although, above, the gearmotors are provided with dot-based rotary encoders, the invention applies equally to other means for detecting movement of the actuator, e.g. such as a cable encoder, a resolver, a Hall effect sensor, a resistive track, or an inertial unit;
- although, above, the monitor and control unit sets a speed setpoint of 5°/s or of 10 cm/s, the invention applies to other values for the speed setpoint, e.g. such as any non-zero angular or linear speed value;
- although, above, the value of the threshold speed is 1 m/s, the invention applies equally to other values for the threshold speed, e.g. such as any non-zero value;
- although, above, the monitor and control unit applies torque increasing at 1 Nm/s, the invention applies to other values of increasing torque, such as for example any non-zero value;
- although, above, the monitor and control unit determines an estimate of the load for handling, the invention applies equally to estimating other types of opposing force, e.g. such as resistance to moving a load running on wheels, or resistance to driving a pile into the ground;
- although, above, the exoskeleton includes a palm contactor, the invention applies equally to other means for detecting an intention to handle the load for handling, e.g. such as a voice command, an attitude sensor, a pressure sensor, or a photoelectric cell;
- although, above, the exoskeleton includes a single palm sensor, the invention applies equally to other means for detecting an intention to handle the load, e.g. such as a cobot having one or more sensors for sensing pressure, flexion, or attitude, one or more accelerometers, or one or more myoelectrical sensors. These sensors may equally well be associated with an artificial intelligence module;
- although, above, the control unit applies an increasing torque command to the actuator, the invention applies equally to other types of increasing command, e.g. such as increasing force command;
- although, above, the step of detecting movement of the actuator includes a step of detecting the actuator crossing a speed threshold, the invention applies equally to other means for detecting movement of the actuator, e.g. such as crossing a movement threshold or an acceleration threshold;
- although, above, the step of detecting movement of the actuator includes a step of detecting the actuator crossing a speed threshold, the invention applies equally to other means for detecting movement of the load, e.g. such as the load crossing a movement, speed, or acceleration threshold, by using hinge position sensors or by using an inertial unit placed on the terminal member of the robot, on the hand of the user, or directly on the load;
- although, above, the estimated value $M_{50es}$ corresponds to the exact weight of the load, the invention applies equally to situations in which the user does apply some lifting force to the load, thereby biasing the estimate. Under such circumstances, the amount of the load that is compensated in operation is reduced by the value of the bias, with the bias continuing to be supported by the user;
- although, above, the operational space command calculates a torque setpoint in hinge or motor space (i.e. for the gearmotors), the invention applies equally to the situation in which the three-dimensional space command calculates a hinge speed setpoint (e.g. using an inverse Jacobean), or a hinge position setpoint (e.g. via an inverse geometrical model);

although, above, the monitor and control module uses the value of the setpoint for the current supplied to the motor(s) in order to determine an estimate of the weight of the load, the invention applies equally to other types of command being applied to the gearmotor, such as for example frequency, voltage, or torque command;

although, above, the sensor linked to the gearmotor is a current sensor or a torque sensor, the invention applies equally to other types of sensor, e.g. such as a sensor for sensing an elongation or shear force on an arm segment. These sensors may be located upstream or downstream from the actuator, and preferably directly at the outlet of the gearmotor;

although, above, the exoskeleton includes first and second myoelectrical sensors located respectively on the biceps and on the triceps of the user, the invention applies to other means for detecting the intention to put down and/or move the load for handling, e.g. such as a single myoelectrical sensor, more than two myoelectrical sensors, or sensors installed on other muscle groups, such as the forearm, the shoulder, the trapezius, or the pectorals; and although, above, the myoelectrical sensors are connected to a neural network based artificial intelligence module, the invention applies equally to other means for analyzing signals coming from these sensors, e.g. such as a simple logic module, an adaptive heuristic criticality module, or an Artmap type module.

The invention claimed is:

1. A control method for controlling an actuator of a cobot, the actuator being functionally connected to a load for handling and being controlled by a monitor and control unit, the method comprising the steps of:
   detecting an intention of a user of the cobot to handle the load for handling;
   when the user and/or the cobot handle the load, applying an increasing command value to the actuator, seeking to cause the load for handling to move until detecting a movement of the actuator or of the load for handling or until detecting that the intention to handle the load for handling has ceased;
   storing the value reached by the command and/or by a sensor linked to the actuator when a movement of the actuator or of the load for handling is detected or when detecting that the intention to handle the load for handling has ceased;
   using the stored value reached by the command and/or by the sensor linked to the actuator to determine an estimate of the opposing force exerted by the load for handling; and
   controlling the actuator by means of a force servocontrol relationship using the estimate of the opposing force exerted by the load for handling in order to establish the commands to be applied to the actuator,
   resetting the value of the estimate of the opposing force exerted by the load for handling to zero when the intention to handle the load ceases to be detected.

2. A control method according to claim 1, wherein the increasing command results from a non-zero speed setpoint applied by the monitor and control unit.

3. A control method according to claim 1, wherein the increasing command comprises an increasing force command applied by the monitor and control unit.

4. A control method according to claim 3, wherein the increasing force command comprises a torque command.

5. A control method according to claim 1, wherein the estimate of the opposing force of the load for handling is determined by using the value taken by a sensor for sensing the current of the actuator when a movement of the actuator is detected.

6. A control method according to claim 1, wherein the estimate of the opposing force of the load for handling is determined by using the value taken by a current setpoint being sent to the actuator when a movement of the actuator is detected.

7. A control method according to claim 1, wherein the step of detecting a movement of the actuator comprises a step of detecting the crossing of a speed threshold or the crossing of a movement threshold or the crossing of an acceleration threshold.

8. A control method according to claim 1, wherein the step of detecting an intention to handle the load for handling comprises a step of detecting a change of state of an intention sensor.

9. A control method according to claim 8, wherein the intention sensor comprises a dry contact.

10. A control method according to claim 8, wherein the intention sensor is positioned on a hand of a user of the actuator.

11. A control method according to claim 8, wherein the intention sensor comprises a pressure sensor and/or an attitude sensor and/or an acceleration sensor and/or a flexion sensor and/or a myoelectrical sensor.

12. A cobot including a monitor and control unit connected to an actuator, the cobot also including detector means for detecting an intention of a user of the cobot to handle a load and/or a sensor linked to the actuator and linked to the monitor and control unit, the cobot being arranged to perform the method according to claim 1.

13. A cobot according to claim 12, wherein the detector means for detecting an intention to handle a load also include an intention sensor, the control unit being arranged to detect an intention to handle the load for handling comprises a step of detecting a change of state of an intention sensor.

14. The control method according to claim 1, wherein the command value controls a torque of the actuator.

15. The control method according to claim 1, wherein the command value controls a force of the actuator.

* * * * *